Patented Dec. 7, 1937

2,101,791

UNITED STATES PATENT OFFICE 2,101,791

ALTERED TUNG OIL AND PROCESS OF MAKING SAME

Carleton Ellis, Montclair, N. J., assignor to Ellis-Foster Company, a corporation of New Jersey No Drawing. Application September 29, 1934, Serial No. 746,145

10 Claims. (Cl. 87—12)

This invention relates to modification of tung oil with polyphenols of the type of resorcinol, pyrocatechol, pyrogallol and the like, and to the process of making the same.

The process of combining tung oil with monophenols is a matter of record. In most cases a very strong catalyst and a high temperature are required. Furthermore, the phenol-modified oil is slow drying and to render such products useful, hardening is effected with formaldehyde, or formaldehyde-containing bodies, after combination of the phenol. Usually an excess of phenol over the tung oil constituent is necessary. The present invention proposes to use a modicum of a polyphenol and to use relatively low temperatures, that is, temperatures of the order of 100°–150° C. The amount of polyphenol depends upon the particular compound used and generally ranges from 5% to 15% of the oil, although larger amounts can be used if desired.

It is known that tung oil alone dries or oxypolymerizes and yields an opaque film, the effect being known as frosting. Heating the oil to a high temperature tends to eliminate this action. However, I have found that by treating tung oil with 15% resorcinol in the presence of 1% oxalic acid (as a condensing agent) at a temperature of about 120° C., I obtain a material which dries without frosting to give a tough, flexible film.

Polyphenols react very readily with tung oil in the presence of condensing agents such as hydrochloric acid, sulphuric acid, phosphoric acid and oxalic acid. The mechanism of the reaction is not entirely clear, but it is thought that reaction occurs by way of the conjugated double bonds in the tung oil molecule and the hydroxyls of the polyphenol. For example, the reaction between pyrogallol and linseed oil (no conjugated double bonds) in the presence of a condensing agent is slow, but may be speeded up by heating under pressure at high temperatures. However, the reaction between pyrogallol and tung oil at atmospheric pressure and low temperatures (120° C.) is so rapid that careful control must be exercized to prevent the mixture from gelling. Also, for purposes of illustration, it may be considered that the hydroxyls of the polyphenol play the role of the reactive groups. Strength is lent to this assumption by the fact that pyrogallol is much more reactive than resorcinol. Thus, 15% resorcinol added to tung oil and heated to 120° C. in the presence of a condensing agent is sufficient to produce a satisfactory varnish base, and 7% pyrogallol in the presence of a condensing agent at the same temperature will give a product of substantially the same consistency. Resorcinol is m-dihydroxybenzene and pyrogallol is 1,2,3-trihydroxybenzene. Assuming that the hydroxyls are the reactive groups, the thickening of the tung oil would be due to a tying up of elaeostearin molecules by means of the polyphenol to form larger molecules and finally a gel structure.

Ordinarily when phenol is reacted with tung oil the products obtained are slow in drying. Raw tung oil when spread in a thin film dries to a frosted surface in 6 to 8 hours. By the addition of organic salts of lead and cobalt the drying time is cut down to from 4 to 5 hours. The products contemplated in this invention are very slow drying when no accelerator is present. However, with the addition of 1% to 3% of lead and cobalt driers of the type generally used in varnishes, they dry to a tack-free coating in 1¼ hours. This acceleration of drying is unexpected and the effect cannot be deduced from previous known work with phenol and tung oil. The reaction with polyphenols seems to produce an accelerating effect over the action of the lead and cobalt driers. Iodine number determinations on the products of the present invention produced by reaction of resorcinol and tung oil and pyrogallol and tung oil are in general higher than on the original raw tung oil. This fact also is unpredictable and might be due to two causes: (1) the substitution of iodine in the aromatic constituent, and (2) acceleration of iodine addition to the ethenic bonds due to the presence of the aromatic constituent.

Tung oil is stressed in the examples which follow as the drying oil which reacts most readily with polyphenols. However, it is not the intention to limit this invention to the reaction of tung oil alone, but to include reaction of polyphenols with mixtures of tung oil any one or more of the group linseed oil, soy bean oil, perilla oil, rapeseed oil and other drying or semi-drying oils. While oils such as linseed, and perilla oil do not combine very rapidly with poly-phenols, mixtures of tung oil with these oils react to give thickened materials ranging from viscous liquids to rubber-like masses. The present invention presents a means whereby tung oil may be firmly combined chemically with other drying and semi-drying oils.

Although the primary object of this invention is to provide a means of modifying tung oil with a polyphenol to produce an oil of rapid drying qualities which does not frost when dry, it should also be noted that this modified oil is extremely reactive with formaldehyde and formaldehyde-containing bodies. When a modified product, such as that from tung oil heated to 120° C. with 15% resorcinol and 1% oxalic acid for 2½ hours, is heated to 125° C. with as low as 1% paraformaldehyde, hardening and gelation takes place with extreme rapidity. In this way an excellent baking enamel may be produced by grinding the resorcinol-modified tung oil with appropriate amounts of pigments and fillers, along with 1% to 5% of a solid polymer of formaldehyde. Such an enamel will bake to a hard, flexible coating in a very short time. It may also be used for impregnating fabric for the production of waterproofed cloth and electrical insulation.

Furthermore, by incorporating a polyphenol-modified tung oil with a further amount of a highly reactive phenol such as pyrogallol and applying heat, further hardening similar to that which takes place with formaldehyde is observed.

Due to the influence of the chemically combined aromatic constituent of the modified tung oil, its solubility and miscibility differ from that of the raw tung oil. This fact, coupled with its non-frosting characteristics, is of value in the preparation of varnishes. The product is miscible with drying oils and oil-soluble resins. Also, many resins which are not soluble in raw tung oil, such as cresol-formaldehyde resins, may be dissolved in a suitable solvent and blended cold with the modified tung oil in a similar solvent. Furthermore, some of the natural copals which are soluble in tung oil only after protracted heating, may be blended in toluol, or toluol-mineral spirits mixtures to give a quick drying varnish.

Another phase of the present invention contemplates the reaction of tung oil with amounts of a polyphenol sufficient only to cause slight thickening of the oil. This slightly thickened oil is then reacted with a small amount of formaldehyde, a solid polymer thereof, or an active methylene-containing body, to give a varnish base which will not frost on drying or baking. For instance, tung oil, 7% resorcinol and 1% oxalic acid when heated to 120° C. for 2 hours will give a slightly thickened oil. By heating this further with 2% to 3% paraformaldehyde a very viscous varnish base results which on mixing with appropriate driers and spread in a thin film, hardens to a frost-free, smooth surface.

The modified tung oil described herein is soluble or miscible in all proportions with raw tung oil, linseed oil, or other drying or semi-drying oils and may be blended with them in any proportion. For instance, a product formed by the reaction of resorcinol on tung oil in the presence of an acid condensing agent at 120° C. may be taken to the stage where it is not fusible but softens under heat. This product by heating to 120°–130° C. with raw tung oil may be rendered liquid and usable as a varnish, or impregnating material. Besides being miscible with resins such as copals and cresol-formaldehyde, the modified tung oil is also compatible with rosin, rosin ester, rosin-phenol-formaldehyde resins, vinyl resins such as polyvinyl acetate and polymerized mixtures of vinyl acetate and vinyl chloride. It is also miscible with rubber and the mixture in benzol solution dries to give a flexible non-tacky film.

Condensing agents in carrying out the reaction between tung oil and polyphenols include mineral acids such as sulphuric, hydrochloric, phosphoric and boric; organic acids such as oxalic, phthalic, acetic, lactic and benzoic; and dehydrating salts such as zinc chloride. Oxalic acid is a desirable condensing agent since it does not have the pronounced polymerizing effect of some of the strong acids.

Resorcinol is a readily available polyphenol. In place of resorcinol I may use pyrocatechol, orcinol, pyrogallol, phloroglucinol and the like. Hydroquinone is not very soluble in tung oil and is therefore less reactive than other polyphenols. By polyphenols is meant any aromatic hydrocarbon containing more than one hydroxyl group, these groups preferably being attached to the same benzene ring.

Below are given several examples of the procedures involved in the present invention. They must not be construed as in any way limiting, but are to be taken as illustrative.

*Example 1.*—One kilogram of raw China wood oil is heated with 150 grams of refined resorcinol and 10 grams of oxalic acid crystals. As the temperature approaches 100° C. the oxalic acid and resorcinol melt and dissolve in the oil. It is best to use stirring during the time the solid material is being dissolved in the oil to prevent local polymerization. The oil has reached a desirable viscosity when a sample cooled to room temperature is a rubbery, sticky mass. When the oil has reached this state, that is, in 1½ to 2½ hours at 110° C., it must be cooled down rapidly to prevent complete gelation and the formation of an insoluble, infusible mass. That substantially all the resorcinol has combined with the tung oil may be shown by boiling a 10 gram sample of the above product in 100 grams of water for 4 hours. A test of the water with ferric chloride shows only a trace of extracted resorcinol. The water contains oxalic acid which has been completely extracted from the resorcinated product.

The material described in this example is only slightly darker than the original raw tung oil. It is somewhat rubber-like in consistency and very sticky at room temperature. When heated to 110° C. or above it becomes liquid, but has a tendency to gel if heating is continued. The material is readily soluble in benzol, toluol, xylol, and a mixture of benzol and ethyl alcohol, toluol and ethyl alcohol, xylol and ethyl alcohol, toluol and butanol, toluol and ethyl acetate, benzol and methyl alcohol, xylol and amyl alcohol, and so forth. It is also soluble in a mixture of a mineral spirit, such as V M & P naphtha, and a hydrocarbon such as toluol, or a mixture of mineral spirits and an alcohol such as ethanol or butanol.

*Example 2.*—One kilogram of raw tung oil is mixed with 70 grams of pyrogallic acid and 10 grams of oxalic acid crystals. The mixture is slowly heated to 110° C. in a uniformly heated vessel and stirred continuously to insure homogeneity. Around 90°–100° C. the pyrogallol and oxalic acid melt and dissolve in the tung oil. In this case thickening takes place with greater rapidity than in Example 1 and a satisfactory product is obtained after 1 to 2 hours. Determination of the stage to which the reaction has progressed is the same as in Example 1 and the product must be cooled rapidly by circulated water when the reaction is sufficiently advanced. The material is soluble in the same solvents as that of Example 1.

*Example 3.*—One kilogram of raw tung oil is mixed with 100 grams of resorcinol, 10 grams of pyrogallic acid and 10 grams of oxalic acid. The mixture is heated to 120° C. in a uniformly heated vessel and stirred to insure homogeneous mixing. The oil thickens slowly until at the end of two hours it has reached a viscosity such that when cooled to room temperature it is a very viscous liquid, soluble in the solvents listed under Example 1.

*Example 4.*—One kilogram of raw tung oil and 1 kilogram of raw linseed oil are mixed with 300 grams of resorcinol and 20 grams of oxalic acid. The oil mixture is heated to 125° C. for about 2½ hours. At room temperature the product is a very viscous liquid which flows with reluctance. It is soluble in the solvents mentioned under Example 1. When lead and cobalt driers are added to the modified oil, it dries in from 8 to 10 hours. That of Example 1 dries in general in 1¼ hours.

*Example 5.*—One kilogram of raw tung oil, 150 grams of resorcinol and 50 grams of a 35% hydrochloric acid solution are mixed and heated to 120° C. Stirring is carried out vigorously while the reaction takes place to prevent local polymerization. The product obtained in 1½ to 2½ hours is similar to that obtained in Example 1.

*Example 6.*—One kilogram of tung oil is mixed with 120 grams of resorcinol and 10 grams of 85% orthophosphoric acid. The mixture is heated to 120° C. The oil slowly thickens. In 2½ hours it reaches a viscosity such that when cooled to room temperature the product is a very viscous liquid which flows very slowly. It is soluble in the solvents mentioned in Example 1 and has an iodine number just above that of the raw tung oil used.

*Example 7.*—One kilogram of raw tung oil, 1 kilogram of soya bean oil, 300 grams of resorcinol and 20 grams of oxalic acid are mixed and heated in a steam jacketed vessel to 120° C. Stirring is carried out, at least while the resorcinol and oxalic acid are dissolving in the oil mixture. The product slowly thickens during 2½ hours. This modification is a very viscous liquid at room temperature and is comparable with the material obtained in Example 4. It is soluble in the solvents listed under Example 1.

*Example 8.*—One kilogram of raw tung oil, 1 kilogram of perilla oil, 300 grams of resorcinol and 20 grams of oxalic acid are mixed and heated to 120° C. in a uniformly heated kettle. Stirring is carried on, preferably throughout the entire reaction. Heating is continued for 2½ hours and the oil mixture slowly increases in viscosity. At room temperature the product is a very viscous liquid soluble in the solvents mentioned in Example 1.

*Example 9.*—One kilogram of raw tung oil, 120 grams of resorcinol and 20 grams of glacial acetic acid are mixed and heated in an autoclave to 125°–130° C. In 2½ hours the oil increases considerably in viscosity. Although the catalytic action of acetic acid is not as strong as that of oxalic acid, similar products are obtained when heating is carried out in an autoclave to prevent loss of acetic acid and to increase the pressure.

*Example 10.*—One kilogram of raw tung oil, 150 grams of resorcinol and 20 grams of 80% lactic acid are mixed and heated to 125° C. in an autoclave. Stirring is preferably carried out to prevent local gelation. The action of lactic acid is similar to that of acetic acid described in Example 9. The product obtained is soluble in the solvents listed in Example 1.

*Example 11.*—One kilogram of raw China wood oil is mixed with 150 grams of resorcinol and 10 grams of oxalic acid. The mixture is heated in a kettle to 120° C. for about 2 hours. This product is a very viscous liquid at room temperature (composition A).

One kilogram of raw China wood oil is mixed with 100 grams of paraformaldehyde and 10 grams of oxalic acid. This mixture is heated to 120° C. in an autoclave for 5 hours to effect combination of the formaldehyde with the tung oil (composition B).

Preparations A and B are mixed together and heated to 120°–125° C. for ½ hour. At room temperature the final product is a soft, sticky solid, light in color and rather rubbery.

*Example 12.*—One kilogram of raw China wood oil, 70 grams of resorcinol and 10 grams of oxalic acid are mixed and heated to 125° C. in a uniformly heated vessel with constant stirring. When the viscosity has reached a maximum the mixture is cooled down. At room temperature it is more viscous than raw tung oil, but flows easily. This type of product is especially useful in producing a baking enamel. The thickened oil is ground with 300 to 500 grams of titanium oxide and 50 grams pyrogallol. When applied as a film and baked in an oven at 100° C. for 15 minutes a tough, flexible, insoluble coating results.

*Example 13.*—One kilogram of raw tung oil is mixed with 80 grams of resorcinol and 10 grams of oxalic acid. The mixture is heated, while being stirred, in a uniformly heated kettle to 120° C. for 2½ hours. 30 grams of paraformaldehyde are then mixed with the thickened oil and heating is continued in an autoclave at 130° C. When all the aldehyde has reacted the oil is cooled to room temperature. It is an extremely viscous liquid and is soluble in all the solvents listed in Example 1. By adding a japan drier to the solution a quick-drying varnish is obtained.

*Example 14.*—One kilogram of raw tung oil is mixed with 150 grams of catechol and 10 grams of oxalic acid. The mixture is slowly heated, while being stirred, to 120° C. The catechol and oxalic acid dissolve in the oil at about 90°–100° C. Above this temperature the oil slowly thickens until it reaches a viscosity comparable to that of Example 1. The thickened oil is then rapidly cooled by means of externally circulated water. This product is a rubber-like, somewhat sticky, solid and is soluble in the same solvents as the product of Example 1. It is highly reactive with formaldehyde.

*Example 15.*—One kilogram of raw linseed oil, 1 kilogram of raw tung oil, 200 grams of pyrogallol and 20 grams of oxalic acid are mixed and heated in a uniformly heated kettle to 125° C. The mixture slowly increases in viscosity until after 2½ hours a sample cooled to room temperature is a very viscous liquid, or soft, sticky solid. It is soluble in all the solvents listed under Example 1 and with lead manganese and cobalt driers it dries in about 10 to 15 hours.

*Example 16.*—One kilogram of raw tung oil is mixed with 100 grams of pyrogallic acid and 10 grams of oxalic acid. The mixture is heated to 120° C. in a kettle for about 1½ to 2 hours. At room temperature the mixture is a very viscous liquid (composition A).

One kilogram of tung oil is mixed with 270 grams of 37% (by weight) aqueous formaldehyde (which would contain about 100 grs. actual formaldehyde) and 20 grams of 90% formic acid. The mixture is placed in an autoclave fitted with a stirring apparatus and heated to 120°–125° C. for 7 to 10 hours. At the end of this time the formaldehyde has loosely combined with the tung oil and is readily given up if the oil is heated to above 120° C. at atmospheric pressures. The formaldehyde-tung oil is washed, then dried in a vacuum (composition B).

Compositions A and B are mixed and heated to 120°–125° C. for ½ hour. The final product is a light-colored, soft, sticky, somewhat rubbery solid, soluble in the solvents of Example 1.

*Example 17.*—One kilogram of tung oil, 1 kilogram of raw linseed oil, 200 grams of resorcinol, 40 grams of pyrogallic acid and 20 grams of oxalic acid are mixed and heated to 120° C. in a steam-jacketed vessel. In about 2½ hours the oil mixture has thickened so that when cooled to room temperature the material is a very viscous liquid, flowing with reluctance. It is readily soluble and its solutions dry rapidly when organic acid salts of lead and cobalt are present.

*Example 18.*—One kilogram of tung oil, 1 kilogram of soya bean oil, 200 grams of resorcinol, 40 grams of pyrogallol and 20 grams of oxalic acid are mixed and heated to 125° C. for 2 hours. At room temperature the product is a very viscous liquid.

*Example 19.*—One kilogram of raw tung oil, 100 grams of resorcinol, 50 grams of catechol and 10 grams of orthophosphoric acid are mixed and heated in a kettle to 120° C. The oil increases in viscosity and at the end of 2 hours should be cooled down. It is a very viscous liquid and soluble in all the previously stated solvents.

*Example 20.*—One kilogram of raw tung oil, 50 grams of pyrogallic acid and 10 grams of oxalic acid are mixed and heated to 120° C. Heating is continued until the oil does not increase further in viscosity. At this point 30 grams of paraformaldehyde are added and heating continued in an autoclave at 120° C. for about 1 hour. The material resulting is a very viscous liquid at room temperature, soluble in the solvents listed in Example 1.

*Example 21.*—One kilogram of raw tung oil, 40 grams of pyrogallic acid, 50 grams of resorcinol and 10 grams of oxalic acid are mixed and heated to 120° C. in a kettle fitted with suitable stirring apparatus. When the oil has reached a maximum viscosity, 20 grams of a solid polymer of formaldehyde are added and heating continued in an autoclave at 120° C. for 1 hour. The product is a very viscous liquid at room temperature and dries to a non-frosted surface when lead and cobalt driers are added to its solution.

*Example 22.*—One kilogram of tung oil, 1 kilogram of perilla oil, 100 grams of pyrogallic acid, 80 grams of resorcinol and 20 grams of oxalic acid are mixed and heated to 120° C. until the oil has reached a maximum viscosity. 40 grams of a solid polymer of formaldehyde are added and heating is continued in an autoclave at 120° C. for 1 hour. When cooled to room temperature the material is an extremely viscous oil, or a soft, sticky solid. It is soluble in the solvents listed above.

*Example 23.*—One kilogram of tung oil, 1 kilogram of raw linseed oil, 300 grams of resorcinol and 20 grams of oxalic acid are mixed and heated to 125° C. In 3 hours the oils reached a maximum viscosity. At room temperature the mixture is a very viscous liquid (composition A).

Two kilograms of raw China wood oil, 2 kilograms of glacial acetic acid and 200 grams of paraformaldehyde are heated together under reflux for 4 hours, to effect combination of the formaldehyde with the tung oil. The mixture is cooled down, washed thoroughly with water and dehydrated under reduced pressure (composition B).

Compositions A and B are mixed and heated to 125° C. for ½ hour. The final product is a very viscous liquid, more viscous than composition A. It is light in color and soluble in the solvents described under Example 1.

*Example 24.*—One kilogram of tung oil, 1 kilogram of rapeseed oil, 160 grams of resorcinol, 40 grams of pyrogallic acid and 20 grams of oxalic acid are heated to 125° C. for about 3 hours. In this time the mixture reaches its maximum viscosity and at room temperature is a very viscous liquid (composition A).

Two kilograms of raw China wood oil are mixed with 600 grams of 37% (by weight) aqueous formaldehyde and 10 grams of concentrated sulphuric acid. The mixture is heated under reflux for 5 hours with constant stirring. The product is thoroughly washed with water and dehydrated in a vacuum (composition B).

Compositions A and B are mixed and heated to 125° C. for ½ hour. The final product is a very viscous liquid at room temperature, more viscous than composition A alone. It is rather dark in color and is soluble in the solvents described in Example 1.

*Example 25.*—One kilogram of raw tung oil, 150 grams of pyrogallic acid and 10 grams of oxalic acid are mixed and heated to 110° C. in a uniformly fired kettle equipped with a suitable stirring apparatus. When heating has taken place for 1 hour, or until quite a noticeable increase in viscosity has occurred, the source of heat is removed and the batch allowed to cool. If careful control has been exercised, the consistency at room temperature will be a soft, sticky solid which is soluble in the above mentioned solvents. When this material is again heated to 120°–125° C. it gels in a short time.

*Example 26.*—One kilogram of tung oil acids, obtained by hydrolysis of raw tung oil, is mixed with 150 grams of resorcinol and 10 grams of oxalic acid. The mixture is heated in a kettle to 125° C. until (about 3 hours) a sample when cooled to room temperature no longer crystallizes. The resulting product is a viscous liquid quite dark in color.

*Example 27.*—One kilogram of tung oil acids is mixed with 100 grams of pyrogallic acid and 10 grams of oxalic acid. The mixture is heated to 120° C. for 3 hours. At the end of this time the mixture no longer crystallizes to a solid when cooled, but is a very viscous liquid.

As pointed out above, tung oil differs from such oils as linseed, perilla, soya bean, castor and rapeseed in that it contains conjugated double bonds in the fatty acid radical. Vegetable oils containing double bonds not conjugated are for present purposes designated as being of the linseed oil type. Although the latter do not react with polyphenols as readily as oils of the tung oil type, they can combine at high temperatures or in admixture with tung oil. In place of raw tung oil as mentioned in the above examples, various other forms and derivatives of the oil can be used, for example, bodied and blown tung oil, tung oil acids and esters, or the beta-modification of tung oil and tung oil acids. It should be noted that the tung oil modifications of the present invention are siccative, viscous liquids or rubber-like masses and are in contrast with the oily non-drying products of monophenols and tung oil.

One notable feature of products such as derived from tung oil and resorcinol is their resistance to water, aqueous acids and petroleum hydrocarbons. Dried films of resorcinated tung oil were immersed in water and in dilute hydrochloric acid for a month without showing visible change. A dried film also resisted the solvent action of mineral spirits. Coatings of resorcinated tung oil and similar modifications of tung oil are therefore suggested for application under adverse conditions of exposure such as on surfaces in contact with petroleum distillates.

In the appended claims, "formaldehyde material" is intended to cover polymers of formaldehyde, solutions of formaldehyde and formaldehyde-containing bodies.

What I claim is:

1. A siccative composition comprising the reaction product of a polyphenol of the class consisting of orcinol, phloroglucinol, resorcinol, pyrocatechol and hydroquinone, with a material containing tung oil, which composition is produced by heating the polyphenol with the tung oil material in the presence of an acid condensing agent at temperatures sufficiently high to cause a chemical reaction but not exceeding about 150° C., and which composition is thicker than the original raw oil and is miscible with glyceride oils, and when dissolved in a solvent to which driers are added and then applied to a surface in a thin film, dries to a frost-free surface.

2. A siccative composition comprising the reaction product of a polyphenol with a material containing tung oil, which composition is produced by heating the polyphenol with the tung oil material in the presence of an acid condensing agent at temperatures sufficiently high to cause a chemical reaction but not exceeding about 150° C., and which composition is soluble in organic solvents and solvent mixtures and when dissolved in a solvent to which driers are added and then applied to a surface in a thin film, dries to a frost-free surface.

3. The process of producing a varnish base which comprises heating a polyphenol with a tung oil material in the presence of an acid condensing agent at temperatures sufficiently high to cause a chemical reaction but not exceeding about 150° C., until a sample cooled to room temperature is a soft, rubbery, sticky solid, and cooling the main portion of the reaction mass when this viscosity has been reached as indicated by the said cooled sample, and at a speed of cooling whereby gelation is prevented.

4. The product produced by the process of claim 3.

5. A process which comprises heating a fatty oil containing one of the class consisting of tung oil, tung oil acids and tung oil esters with 5 to 15% of a polyphenol in the presence of an acid condensing agent at temperatures sufficiently high to cause a chemical reaction, but not exceeding about 150° C., until a thickening of the mass has been accomplished, whereby a varnish base is produced, which base when dissolved in suitable solvents to which driers are added and applied to a surface in a thin film dries rapidly to a hard, smooth frost-free film.

6. The product produced by the process of claim 2.

7. The process as set forth in claim 2 in which tung oil is first reacted with a polyphenol and thereafter reacted with a formaldehyde material at temperatures not exceeding about 150° C.

8. A siccative composition comprising the product produced by reacting together a tung oil material, a polyhydric phenol and a formaldehyde material in the presence of an acid condensing agent at temperatures sufficiently high to cause a chemical reaction, but not exceeding about 150° C., and which composition is a viscous oil to a sticky, rubbery solid, and when dissolved in suitable solvents and applied to a surface in thin films dries frost-free.

9. A siccative composition comprising the reaction product produced by reacting a tung oil containing material and a polyhydric phenol in the presence of a condensing agent at temperatures sufficiently high to cause a chemical reaction, but not exceeding about 150° C., until the tung oil composition has increased in viscosity, and which siccative composition when dissolved in suitable solvents to which driers are added will air dry in thin films to a frost-free surface, or when baked at as high as 100° C. in the form of thin films will produce tough, flexible films.

10. A siccative composition comprising the reaction product of a polyphenol with a material containing tung oil, which composition is produced by heating the polyphenol with the tung oil material in the presence of an acid condensing agent at a temperature of the order of 100–150° C., and which composition is thicker than the original raw oil and is miscible with glyceride oils, and when dissolved in a solvent to which driers are added and then applied to a surface in a thin film, dries to a frost-free surface.

CARLETON ELLIS.